Patented Nov. 27, 1928.

1,692,996

UNITED STATES PATENT OFFICE.

BENJAMIN P. RICHARDSON, OF BROOKLINE, MASSACHUSETTS; EMMA D. RICHARDSON EXECUTRIX OF BENJAMIN P. RICHARDSON, DECEASED.

METHOD FOR PROTECTING GRANULAR SUBSTANCES AND RESULTING PRODUCT.

No Drawing.   Application filed December 10, 1925.   Serial No. 74,650

This invention relates to chemically active solids or the like, and more especially to a method for providing such substances with a protective coating or integument and the product resulting from the application of the invention.

In the manufacture, storage, and use of various solid substances which are susceptible of chemical or physical reactivity, it is a matter of common experience that these substances undergo a material change of their desirable properties (often by mere contact with the atmosphere) without control and without thereby serving any useful purpose whatsoever, resulting in an impure or degenerated product which is in consequence partially or completely destroyed with respect to those properties for which the original substance was commercially valuable.

Accordingly, it is an object of the present invention to provide a method for the protection of such substances prior to or during the course of manufacture, storage and use. It is a further object to provide a normally reactive chemical product in which the individual solid lumps or granules of which it is composed are severally resistant to the destructive chemical or physical actions to which they may be subjected.

It is a further object to produce such a product which, while resistant to the deteriorating agencies of storage and transportation for example, is nevertheless rendered reactive more or less rapidly and completely when subjected to the more active conditions and agencies attendant upon the uses for which it is intended. Other objects of the invention will appear from the following disclosure.

The method of the invention includes subjecting the granules of the material to be treated to an application thereover of a chemically inert solid substance reduced to the liquid condition, (which may be effected by melting or preferably by dispersing in an appropriate inert fluid) characterized by thoroughly coating the surface of the granules with the fluid mixture thus prepared and causing the resulting deposit to solidify and form a continuous integument, in situ, surrounding the individual granules and presenting a substantially impermeable and permanent coating.

The coating substance thus employed is typically inert with respect to the granules to be coated, and preferably also inert or substantially permanent with respect to the outer agencies which tend to react with the granules. In some instances, however, it may be desirable that the coating shall be only partially inert or protective with respect to surrounding conditions, i. e. its resistance may be such as to be more or less rapidly overcome under the given circumstances of use. In such case it is possible to effectuate control over the reactivity of the coated granules by modifying and apportioning the degree or permanency of the protective coating applied.

It is also generally desirable that the substance shall be physically impervious and tenuous, adapted to assume and retain an extended condition, and to wet the surfaces of the material treated, when in the fluid condition, and to adhere thereto when solidified or when the more volatile vehicle in which it has been initially dispersed as a carrier has been evaporated. Another advantageous qualification is that the substance thus employed shall not be brittle, at least for the more permanent protection against mechanical treatments, and that it shall be to some extent malaxeable or malleable, and subject to viscous flow under unequal pressures.

The specific characteristics of the coating material employed in any given instance will be determined primarily by its reactivity toward the material to be treated, the manner and means by which it is distributed thereover, and the subsequent conditions which the treated material may be expected to encounter, with reference to the coating material and the desired mode in which the reactivity of the chemical substance itself is to be permitted to manifest itself.

Inert hydrocarbon materials, e. g. heavy oils, paraffin, waxes, etc. are typical of and generally applicable for the purposes of this invention and may be employed readily and with satisfactory results. They are easily melted or dissolved and serve as an essentially permanent, inert coating of the granules with respect to the atmosphere, and on the other hand may be gradually removed by heat, by attrition, or by contact with appropriate solvents.

With appropriate substances the coating material may be reduced to the liquid condition merely by melting, as above indicated, but unless a fluid of low viscosity results therefrom, it is usually preferred to distribute the substance through a liquid (serving either as a suspending vehicle or as a solvent therefor) and to employ the thus prepared fluid mixture. The liquid vehicle or solvent thus used is preferably also inert with respect to the granules and not selectively absorbed thereby. It is, however, desirable that the coating liquid or liquid mixture shall as a whole be capable of wetting the granules and (in some instances) of superficially penetrating the outer surface thereof to a slight extent and in either case provide a deposit capable of subsequent solidification.

A specific example of the application of the invention, which is typical of its practical utility and representative of its mode of adaptation, will be described with reference to the treatment of granular calcium chloride which is, for example, intended for use as a moistening agent upon roads.

In this case, the well-known deliquescent properties of calcium chloride are made use of by spreading it upon the surface of dirt roads and the like, whereupon it acquires moisture from the atmosphere in excessive quantities, even when the air is of relatively low humidity. The moisture thus accumulated aggregates the dust particles into a consolidated surface which is not thereafter readily disturbed nor disseminated into the air by the traffic passing over it.

However, this deliquescence of the chloride particles is promptly satisfied by saturation with water. The water thus collected proceeds to dissolve the chloride and the resulting solution percolates into the surrounding soil or subsoil, carrying the chloride with it, and thus defects its further effectiveness for the purpose of keeping the surface damp.

In accordance with the procedure of the invention, the granular calcium chloride is preferably first thoroughly dried as by calcining. A fluid suspension or solution of commercial paraffin, for example, is next prepared with a suitable liquid vehicle or solvent, such as gasoline. It is preferable that the mixture shall be relatively fluid and of low viscosity, which is promoted by using an increased amount of the vehicle. For example, one part of paraffin to four or five parts of gasoline provides a satisfactorily mobile solution of low viscosity, and is readily obtained with a sufficient degree of uniformity.

The dried calcium chloride granules are then thoroughly wet with the paraffin solution, as by spraying, or by completely immersing the granules therein, or other equivalent procedure. The wet granules are then allowed to drain if necessary or may be scattered and spread out in a sheet for this purpose, which separates the individual wet granules and thus permits the solution to extend over and thoroughly coat each. This results in a slightly thicker but more uniform residual coating of the fluid. It may also be helpful to subject the wet granules to a vigorous jarring or shaking. In this manner the coating upon each particle becomes continuous and of a more uniform thickness; at the same time, occlusions of the coating solution between adjacent particles are eliminated, thus preventing aggregation of the granules, and a product is obtained which is composed of uniformly wet but loose and discrete granules of coated calcium chloride.

The charge is then dried (or cooled, or both) preferably slowly and out of contact with the air. Suitable provision may also be made in known ways for recovering the vaporized solvent vehicle therefrom, which may be condensed and used over.

Upon evaporation of the solvent vehicle, the granules severally acquire an impervious, continuous, solid integument of paraffin, which completely surrounds each granule and is intimately associated with its outer surface.

If the thus protected granular particles of calcium chloride are now stored, even though for an appreciable time, and finally transported and spread upon a dirt road or the like, the particles do not deliquesce, but retain the enclosed reagent in its original dehydrated condition, until they are actually in use. Moveover, slight rubbing between the coated particles does not remove the paraffin coating but merely rubs or burnishes the surface, leaving the continuity of the film unimpaired. Upon being heated, however, or crushed and worn by the attrition of traffic passing thereover, the chloride is gradually exposed and, to such extent as the inner, chemically active portion is thus exposed, it becomes effective as a deliquescent salt. Thus the controlled mechanism of reaction brought about serves the same purpose and acts through a retarded but more effective course of reactivity than where the bare calcium chloride granules are applied. Moreover, its activity is prolonged over a much longer period of time and a less ultimate quantity of material is thereby rendered equally effective, with fewer and less frequent applications.

It will be clear that the invention may be applied to other granular solids, with analogous results, and that the procedure employed and the materials used may be greatly modified and substituted in accordance therewith.

It will also be obvious to those skilled in the art that chemically reactive materials thus protected may be employed in innumerable ways, as in the conduct of various chemical processes where sudden or simultaneous contact of the ultimately reactive materials is not desirable. Thus, if the reagent is to be gradually disseminated through a batch of other pulverized solids, without the employment of liquid vehicles, the protected granules may be added thereto and mixed gently with the other powdered substances, without reaction, and subsequently made reactive therewith throughout the batch mixture by any treatment adequate to remove or destroy the protective coating, as by the attrition of active grinding or other violent agitation of the mass. Again, it may be brought to its condition of effectiveness by heating the batch and thereby melting or otherwise destroying the protective coating over the granules. Another instance of application of the invention is in the addition of the protected chemically active material to a liquid reaction mass, in which the inert coating is gradually dissolved. If immiscible, the coating may be subsequently mechanically separated as by gravity and ultimately removed.

In such instances, the effective activity of the chemical reagent will be more or less proportional to the rate at which the protective coating is penetrated or removed, and hence may be controlled by the kind and quantity of the coating material applied.

Such modifications and substitutions of the invention are to be considered as comprehended by the above disclosure and included within the terms of the following claim.

I claim:

A method for protecting chemically active granular materials, comprising treating the same with an excess of a normally inert impermeable solid carried by an inert liquid vehicle, separating and agitating the wet granules, removing the surplus of the fluid mixture, and causing the resulting deposit upon said granules to solidify.

Signed by me at Boston, Massachusetts, this 7th day of December, 1925.

BENJAMIN P. RICHARDSON.